(12) United States Patent
Ikehata et al.

(10) Patent No.: US 7,004,711 B2
(45) Date of Patent: Feb. 28, 2006

(54) TRANSPORTING APPARATUS

(75) Inventors: Yoshiteru Ikehata, Shiga-ken (JP); Takayoshi Ono, Shiga-ken (JP); Yuichi Morimoto, Shiga-ken (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/008,454

(22) Filed: Dec. 9, 2004

(65) Prior Publication Data
US 2005/0129469 A1   Jun. 16, 2005

(30) Foreign Application Priority Data
Dec. 16, 2003   (JP) ............................. 2003-418068

(51) Int. Cl.
    *B65G 35/00*   (2006.01)
(52) U.S. Cl. ............................ 414/676; 406/77; 406/89
(58) Field of Classification Search ................ 414/676; 406/77, 19, 88, 89
    See application file for complete search history.

(56) References Cited

U.S. PATENT DOCUMENTS

| | | | |
|---|---|---|---|
| 2,984,364 A | * | 5/1961 | Lamb .......................... 414/676 |
| 3,822,777 A | * | 7/1974 | Jepsen .................... 198/370.07 |
| 4,457,657 A | * | 7/1984 | Karis et al. ................. 414/790 |
| 4,842,125 A | * | 6/1989 | Besemann ............. 198/457.03 |
| 4,962,841 A | * | 10/1990 | Kloosterhouse ........ 198/370.09 |
| 5,102,288 A | * | 4/1992 | Kawasaka .................... 414/676 |

FOREIGN PATENT DOCUMENTS

| | | |
|---|---|---|
| JP | 2000-62951 A | 2/2000 |
| JP | 2002-321820 A | 8/2002 |

* cited by examiner

*Primary Examiner*—Joe Dillon, Jr.
(74) *Attorney, Agent, or Firm*—The Webb Law Firm

(57) ABSTRACT

The invention discloses a transporting apparatus having a transport member provided with a air-supplying-type support portion for supplying purified air toward a lower surface of a transported object to contactlessly support the transported object, and a drive force application portion for contacting a lower surface of the transported object that is supported by the air-supplying-type support means and applying a drive force in the transporting direction to the transported object. The transporting apparatus, by raising and lowering the drive force application portion and the air-supplying-type support portion relative to one another, can be switched between a transport state where the drive force application portion is brought into contact with the lower surface of the transported object, and a transfer state where the drive force application portion is moved downward away from the transported object that is supported by the air-supplying-type support portion. The transporting apparatus is provided with a loading portion that can receive and support the transported object and that can be moved in a horizontal direction that intersects the transporting direction and in the vertical direction. The loading portion, in the transfer state, can be inserted in the horizontal direction into the space below the transported object.

15 Claims, 16 Drawing Sheets

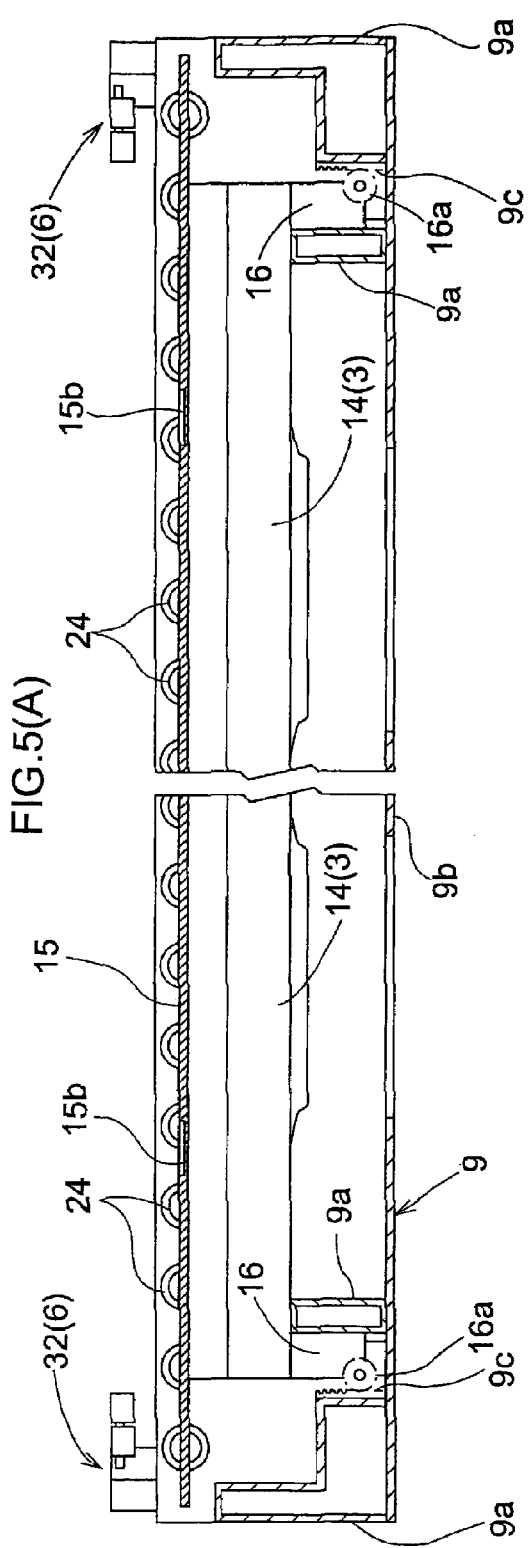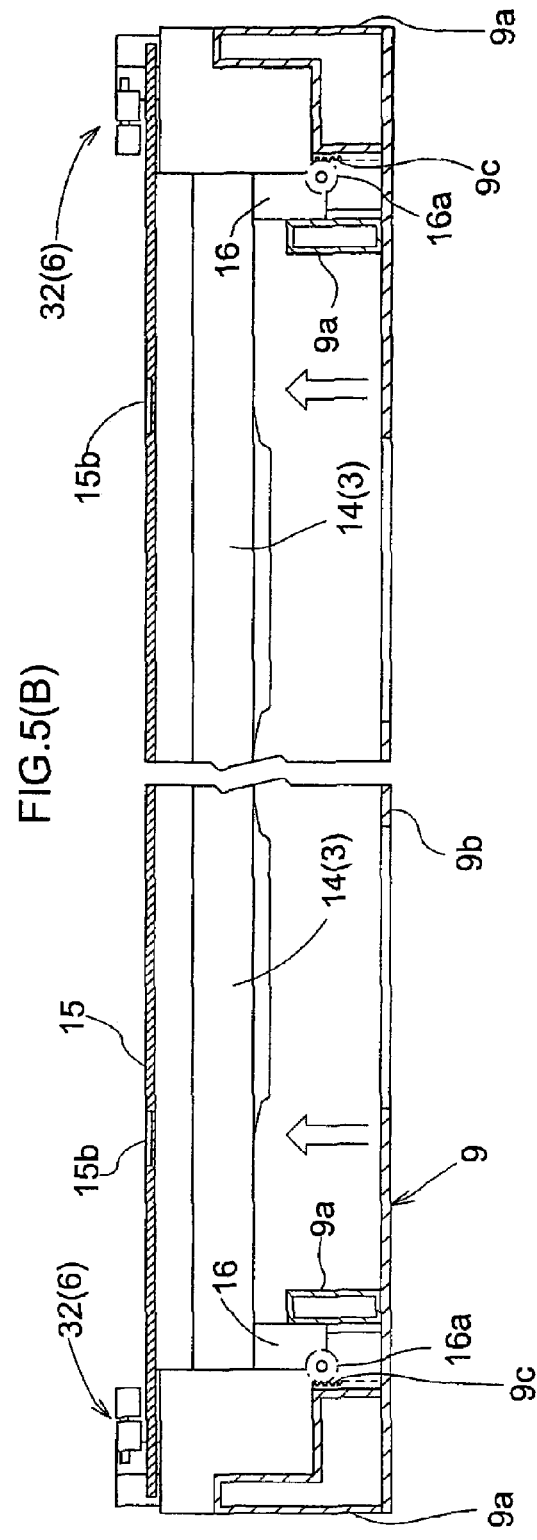

TRANSPORTING APPARATUS

BACKGROUND OF THE INVENTION

The present invention relates to transporting apparatuses provided with a transport member that is furnished with a air-supplying-type support means for supplying purified air toward a lower surface of a transported object to contactlessly support the transported object in a horizontal orientation or a substantially horizontal orientation, and a drive force application means that comes into contact with the lower surface of the transported object that is supported by the air-supplying-type support means and applies a drive force in the transporting direction to the transported object.

In such transporting apparatuses, the air-supplying-type support means contactlessly supports the transported object and the drive force application means applies a drive force in the transporting direction to the transported object in a contacting manner. For example, in a case where a glass substrate for a liquid crystal is transported as the transported object, the air-supplying-type support means contactlessly supports the sections of the glass substrate that are to be processed into products and the drive force application means applies a force in a contacting manner to the sections of the glass substrate that are cut away during product processing (for example, see JP 2002-321820A).

Such conventional transporting apparatuses are configured such that the drive force application means applies a drive force in the transporting direction to the transported object in a contacting manner, and thus even if an attempt is made to perform a scooping task of scooping the transported object from the transporting portion or a lowering task of lowering the transported object onto the transporting portion from a horizontal direction that intersects the transporting direction, using a transfer device provided with a loading portion that can receive and support the transported object, the drive force application means interferes with the loading portion moving in the horizontal direction and thus the loading portion cannot be inserted into the space below the transported object that is supported by the air-supplying-type support means. Therefore it was not possible to perform the scooping task or the lowering task from a horizontal direction that intersects the transporting direction, which was inconvenient.

SUMMARY OF THE INVENTION

The present invention was arrived at in light of the foregoing, and it is an object thereof to provide a transporting apparatus with which it is possible to perform the scooping task and the lowering task from a horizontal direction that intersects the transporting direction of the transport member, with a transfer means that is provided with a loading portion on which the transported object can rest and is supported.

To achieve this object, a transporting apparatus of the present invention is provided with a transport member provided with air-supplying-type support means for supplying purified air toward a lower surface of a transported object to contactlessly support the transported object, and drive force application means for contacting a lower surface of the transported object that is supported by the air-supplying-type support means and applying a drive force in the transporting direction to the transported object. The transport member is provided with a main transport member that is capable of transporting the transported object in the transporting direction, and a transfer transport member that is positioned next to the main transport member in the transporting direction and that is capable of transporting the transported object between itself and the main transport member. The transfer transport member, by raising and lowering the drive force application means and the air-supplying-type support means relative to one another, can be switched between a transport state, in which the drive force application means is brought into contact with the lower surface of the transported object that is supported by the air-supplying-type support means, and a transfer state, in which the drive force application means is moved downward away from the transported object that is supported by the air-supplying-type support means. The transporting apparatus further comprises transfer means furnished with a loading portion that can receive and support the transported object and that can be moved in a horizontal direction that intersects the transporting direction and in the vertical direction, wherein the loading portion, when the transfer transport member is in the transfer state, can be inserted and withdrawn in a horizontal direction, which intersects the transporting direction, into and from a space below the transported object that is supported by the air-supplying-type support means, and moreover, when the loading portion has been inserted into the space below the transported object, the loading portion permits support by the air-supplying-type support means.

With this structure, it is possible to provide a transporting apparatus with which it is possible to perform the scooping task and the lowering task from a horizontal direction that intersects the transporting direction of the transport member using a transfer means, without the drive force application means interfering with the loading portion from moving in the horizontal direction.

BRIEF DESCRIPTION OF THE DRAWINGS

FIG. 5 is a lateral view of the transfer transport member according to the first embodiment;

DETAILED DESCRIPTION OF PREFERRED EMBODIMENTS

A plurality of embodiments are described below, and the features disclosed in a given embodiment can be combined with the features disclosed in another embodiment as long as there are no contradictions between them, and such combinations also are within the scope of the present invention.

First Embodiment

A case in which the transporting apparatus according to the present invention carries a rectangular glass substrate for a liquid crystal as the transported object is described below with reference to the drawings.

Figure 1:
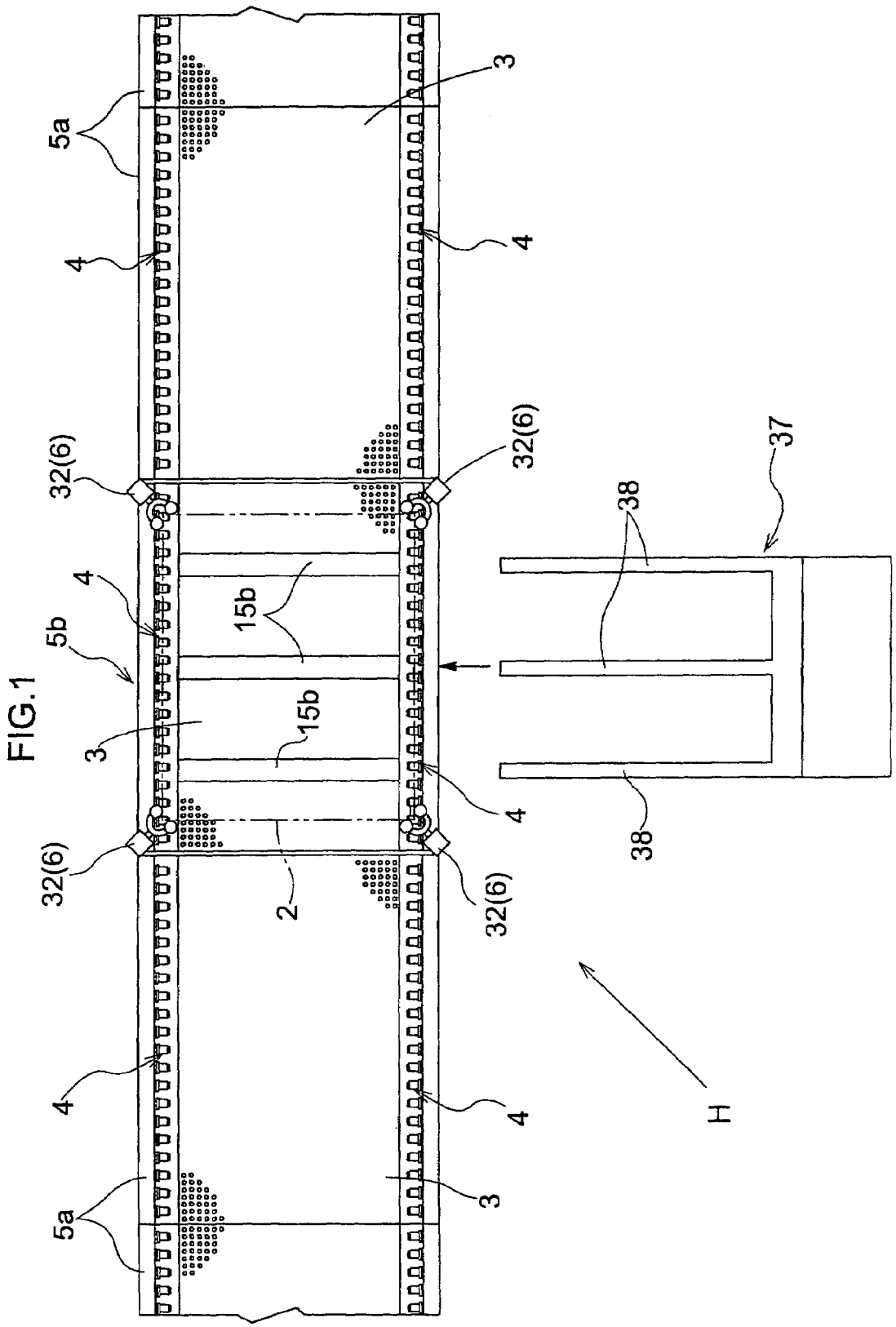
FIG. 1 is a plan view of a transporting apparatus according to the first embodiment.

As shown in FIG. 1, a transporting apparatus H is provided with main transport members 5a that are capable of transporting a glass substrate 2 in the transporting direction and a transfer transport member 5b that is positioned side by side with the main transport members 5a in the transporting direction and that is capable of transporting the glass substrate 2 to and from the main transport members 5a. Also, in the transfer transport member 5b, the transporting apparatus H is provided with a transfer means 37 for performing a scooping task of scooping up the glass substrate 2 that is supported by a air-supplying-type support means 3 and a lowering task of lowering the glass substrate 2 so that it is supported by the air-supplying-type support means 3 of the transfer transport member 5b.

Figure 2:
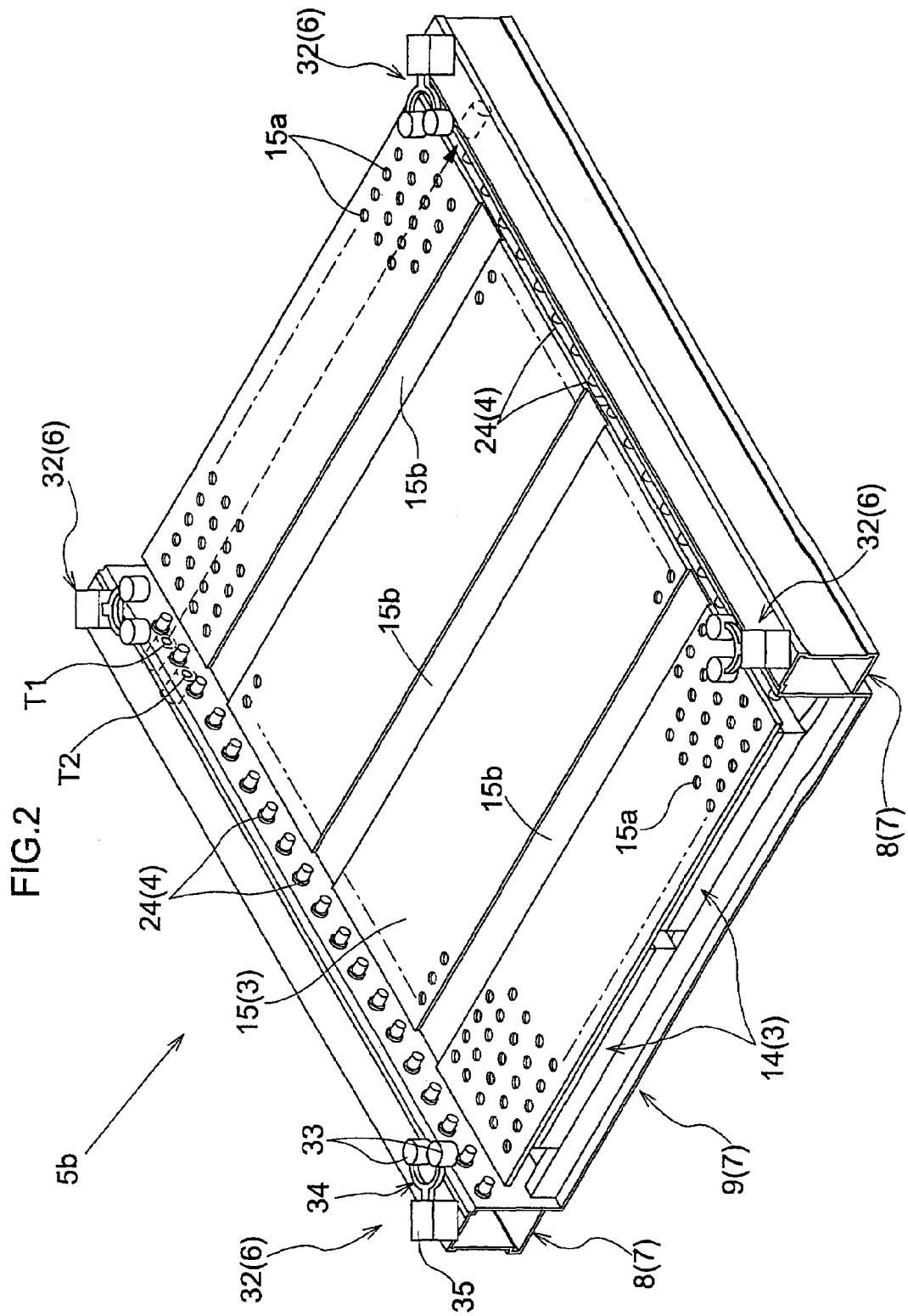
FIG. 2 is a perspective view of the transfer transport member according to the first embodiment.
Figure 8:
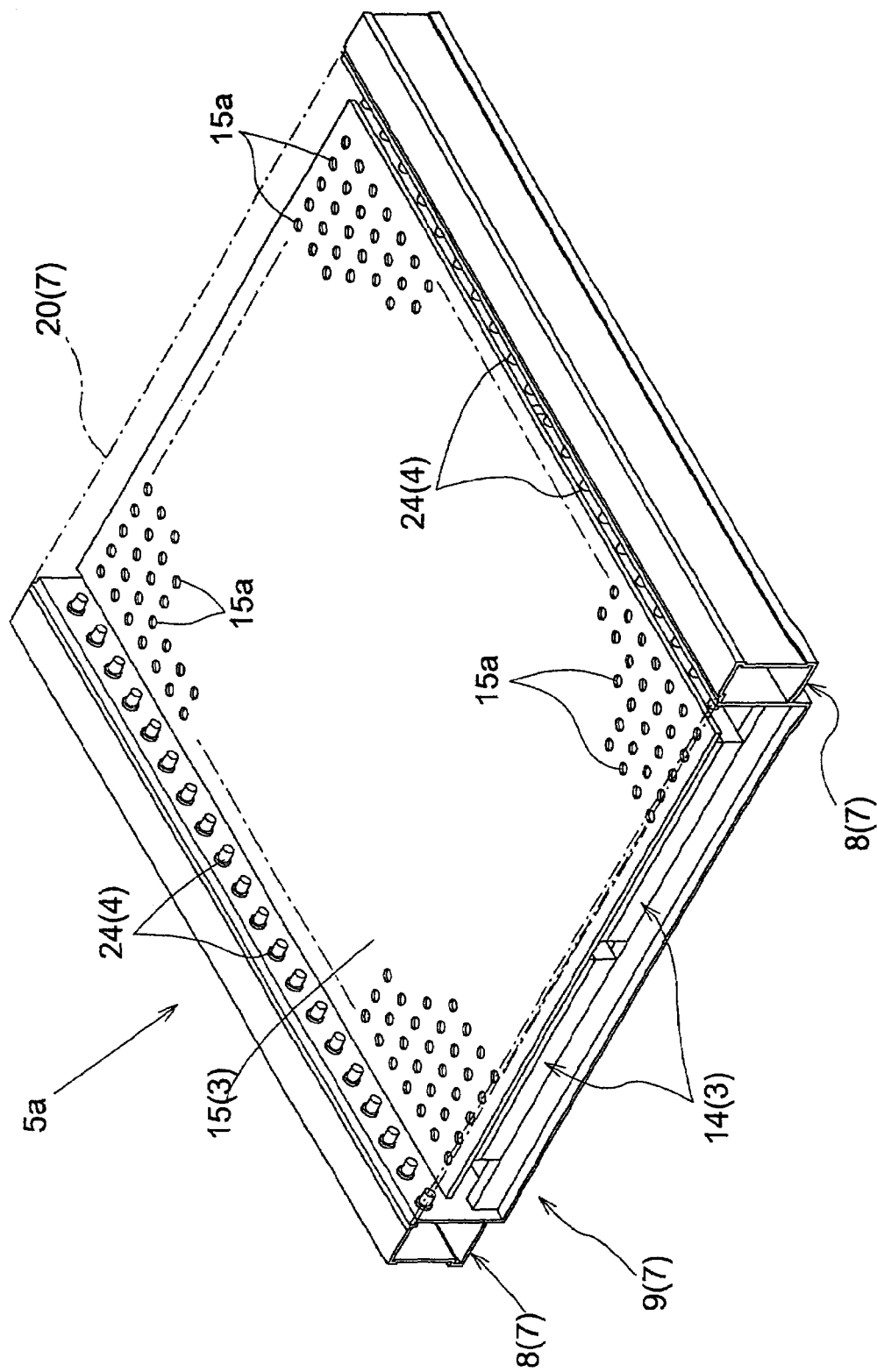
FIG. 8 is a perspective view of the main transporting portion according to the first embodiment.

As shown in FIG. 2 and FIG. 8, each transport member supports the glass substrate 2 with a air-supplying-type support means 3 for supporting the glass substrate 2 in a contactless manner and a drive force application means 4 for supporting the glass substrate 2 in a contacting manner, and the drive force application means 4 applies a drive force in the transporting direction to the glass substrate 2 that is supported so as to transport the glass substrate 2 in the transporting direction. The air-supplying-type support means 3 and the drive force application means 4 are accommodated within an accommodation casing 7.

Figure 11:
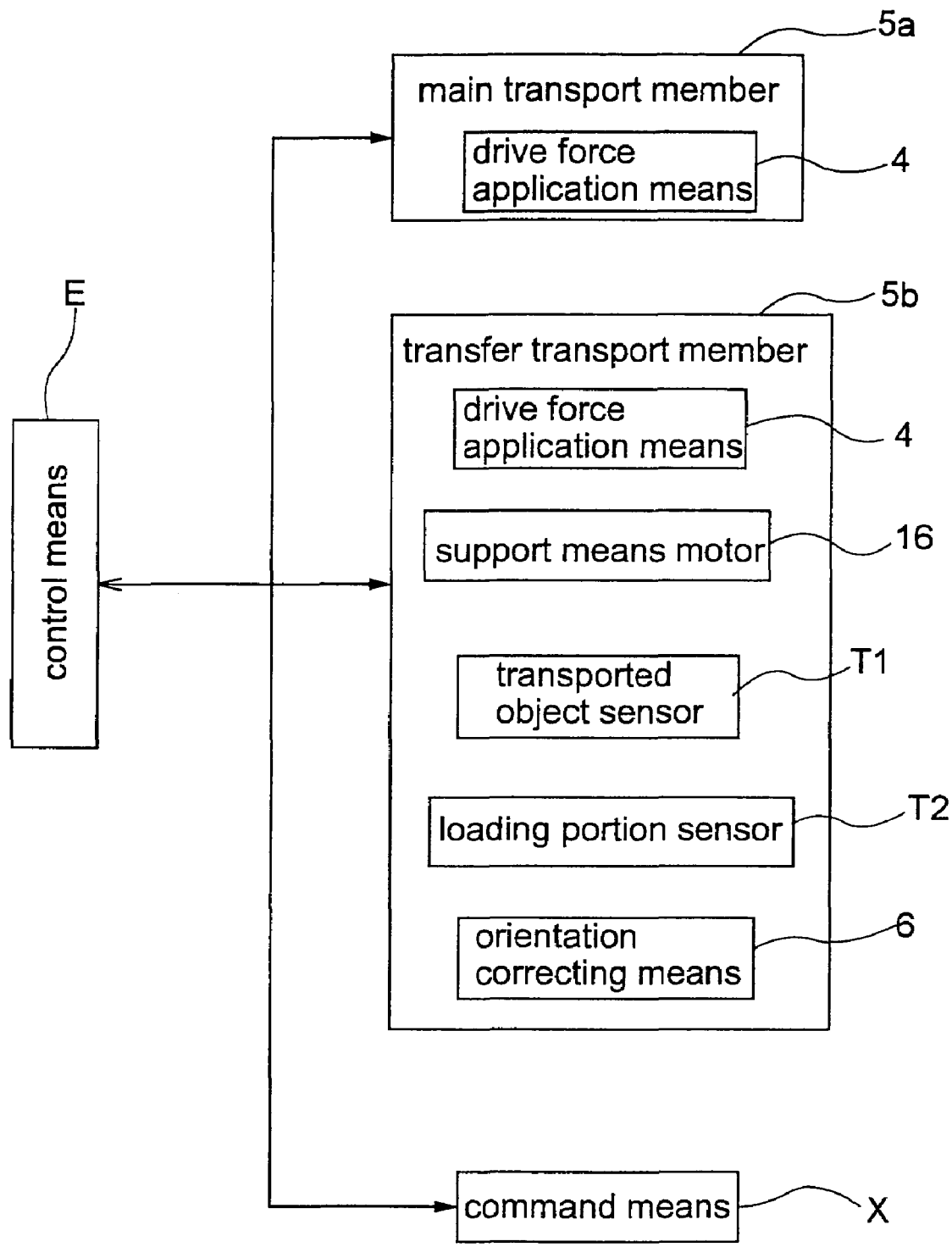
FIG. 11 is a control block diagram of the transporting apparatus according to the first embodiment.

Also, as shown in FIG. 11, the transporting apparatus H is provided with a control means E for controlling operation of the drive force application means 4, an orientation correcting means 6, and a support means motor 16, which raises and lowers the air-supplying-type support means 3, based on the detection results of a transported object sensor T1 that is constituted by a photoelectric sensor for detecting whether or not the glass substrate 2 is present and a loading portion sensor T2 that is constituted by a close-range sensor for detecting whether or not the loading portion is present, and on commands from a command means X through which a person can send a scoop command or a lower command to the transfer transport member 5b. The support means motor 16 is an example of an actuator.

The main transport member 5a is provided with one or a plurality of main transport units in the transporting direction, and the transfer transport member 5b is made of a single transfer transport unit. That is, the transporting apparatus H is made of a combination of a main transport unit(s) and a transfer transport unit.

The transfer transport member 5b is described below.

As shown in FIG. 2, the transfer transport member 5b is provided with a air-supplying-type support means 3, a drive force application means 4 for applying a drive force in the transporting direction to the glass substrate 2, the orientation correcting means 6 for correcting the orientation of the glass substrate 2 by abutting against the glass substrate 2 from the side, the transported object sensor T1, the loading portion sensor T2, and a casing member 7. The casing member 7 accommodates the air-supplying-type support means 3, the drive force application means 4, the orientation correcting means 6, the transported object sensor T1, and the loading portion sensor T2.

Figure 3:
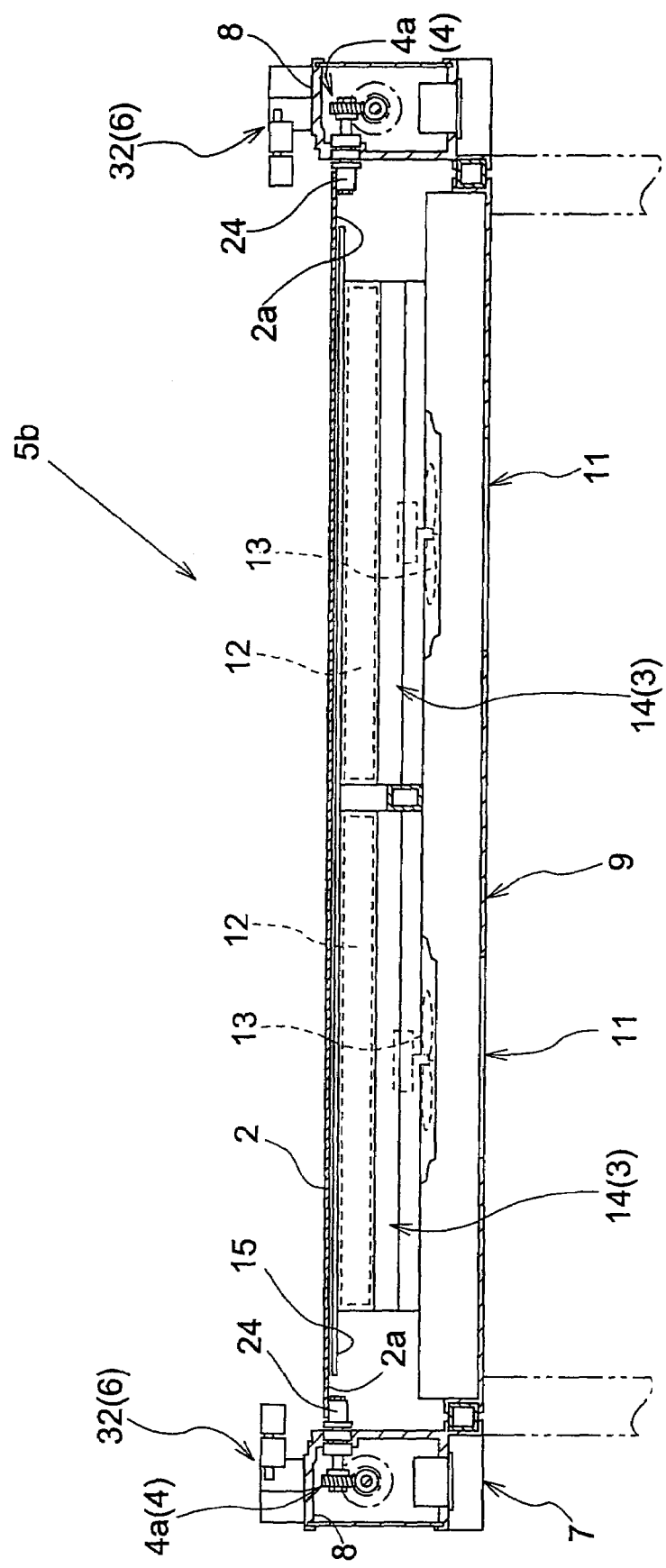
FIG. 3 is a front view of the transfer transport member according to the first embodiment.
Figure 4:
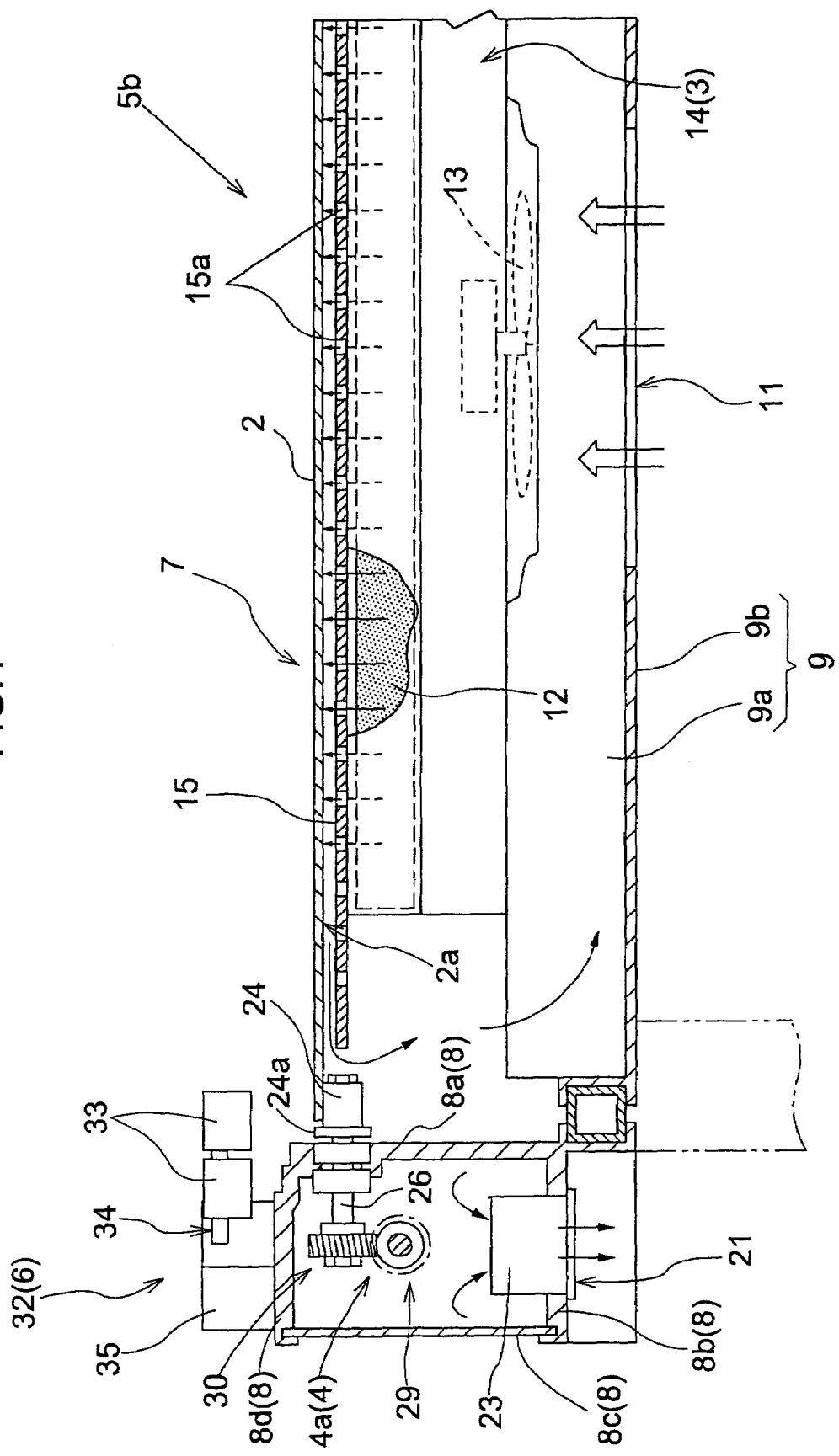
FIG. 4 is a partially magnified front view of the transfer transport member according to the first embodiment.

As shown in FIG. 3 and FIG. 4, the casing member 7 provided in the transfer transport member 5b is furnished with a unit frame member 9 that is substantially rectangular when viewed from above and that receives and supports the air-supplying-type support means 3, and accommodation frames 8 supported in a fixed manner along the transporting direction on both sides in the width direction of the unit frame member 9.

Each accommodation frame 8 has the shape of a rectangular tube when viewed in the transporting direction, and includes an accommodation cover 8c that can be opened and closed on the side opposite the side of an inner wall 8a that is connected to the unit frame member 9. An outside discharge opening 21 for discharging air within the accommodation frame to the outside is provided on a lower wall 8b of the accommodation frames 8. Also, a sub-blowing unit 23 having a blowing function and a dust removal function is provided such that it closes off the outside discharge opening 21, and due to the sub-blowing unit 23, the air within the accommodation frame 8 is purified and discharged to the outside. The unit frame member 9 is made of a support frame portion 9a that incorporates a frame member therein and a plate-shaped frame portion 9b that is a substantially rectangular plate-shaped member positioned lower than the support frame portion 9a and provided with air introduction openings 11 for introducing outside air.

The air-supplying-type support means 3 provided in the transfer transport member 5b is described in the following. As shown in FIGS. 3 to 5, the air-supplying-type support means 3 is provided with a plurality of fan filter units 14 (an example of the blowing units) for supplying purified air toward the lower surface 2a of the glass substrate 2, and an air rectifying plate 15 that rests on and is supported by the fan filter units 14 and that is for rectifying the purified air that is supplied to the lower surface 2a of the glass substrate 2, and as illustrated in FIG. 5 in particular, the air-supplying-type support means 3 is supported by the unit frame member 9 in such a manner that it can be raised and lowered. The fan filter units 14 are provided with a dust removal filter 12 for removing dust and a blower fan (an example of the blowing means) 13 for supplying purified air toward the lower surface 2a of the glass substrate 2 through the dust removal filter 12, these being incorporated into a single unit within a housing. Here, "air rectification" means uniformly dispersing air over a wide range. The plurality of fan filter units 14 are connected to one another by a connecting frame. The air rectifying plate 15 is provided with an upward facing recessed portion 15b in the width direction, which intersects the transporting direction, and through holes 15a formed by a punching press over its entire surface except for the region of the recessed portion 15b. Consequently, the air rectifying plate 15 can also be referred to as a porous plate.

Also, as shown in FIG. 5, an electric support means motor 16 for raising and lowering the fan filter units 14 is provided on the lower surface of the fan filter units 14, and an output gear 16a of the support means motors 16 meshes with a gear groove 9c formed in the lateral surface of a support frame portion 9a of the unit frame member 9. Consequently, by rotatively driving the support means motors 16 forward and in reverse, the air-supplying-type support means 3 provided in the transfer transport member 5b is raised and lowered.

The drive force application means 4 provided in the transfer transport member 5b is described next. As shown in FIG. 2 and FIG. 3, the drive force application means 4 is configured for dual-side driving, being furnished with a pair of drive force application portions 4a for contactively supporting both end portions in the width direction of the glass substrate 2, and the drive force application portions 4a are distributed between the pair of accommodation frames 8.

Figure 6:
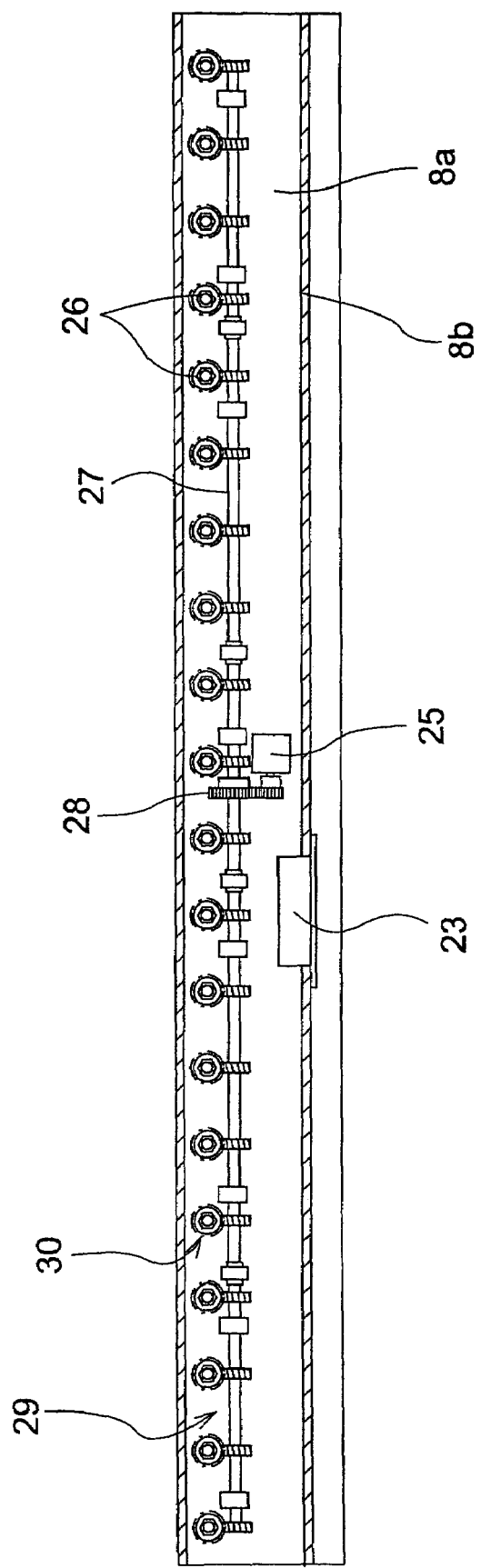
FIG. 6 is a lateral view of the drive force application means according to the first embodiment.
Figure 7:
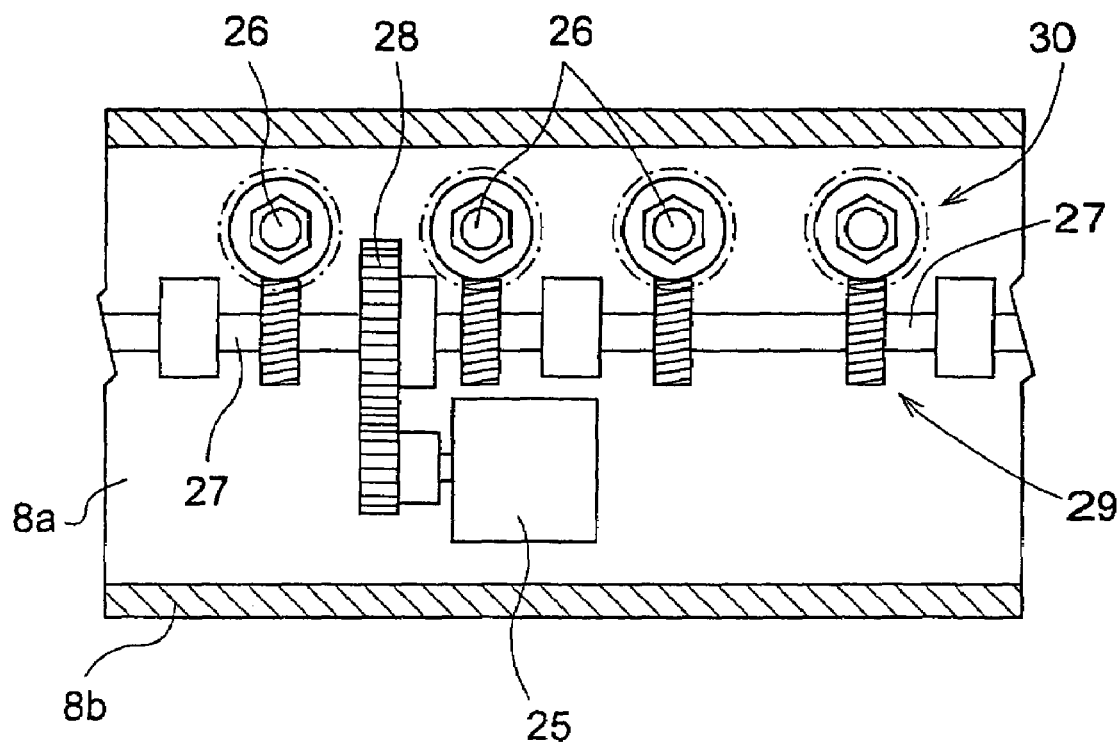
FIG. 7 is a front view of the drive force application means according to the first embodiment.

As shown in FIGS. 5 to 7, the drive force application portions 4a are provided with an electric motor 25, a power transmission shaft 27 provided with a spur gear 28 that meshes with the output gear of the electric motor 25, and numerous output shafts 26 each provided with an input gear 30 that meshes with an output gear 29 provided on the power transmission shaft 27. Also, the electric motor 25 and the power transmission shaft 27 are provided within the accommodation frame 8, and as shown in FIG. 4, the output shafts 26 are rotatively supported by the inner wall 8a in such a manner that each projects from the accommodation frame 8. Drive rollers 24, which are for contactively supporting the lower surface 2a of the glass substrate 2 and supplying a drive force thereto, are provided at portions where the output shafts 26 project from the accommodation frame 8, and as shown in FIG. 4 and FIG. 8, the drive rollers 24 are provided with large diameter portions 24a that abut against the lateral surface on both end portions in the width direction of the glass substrate 2 and keep the glass substrate 2 from moving in the width direction.

The orientation correcting means 6 is described next. FIG. 2 and FIG. 4 show that the orientation correcting means 6 is made of four abutting mechanisms 32. Each of these four abutting mechanisms 32 is fixedly supported to the upper wall 8d of the accommodation frame 8, and is made of a pair of pressing members 33 that are capable of abutting against one lateral face in the front to back direction and one lateral face in the left to right direction, respectively, of the glass substrate 2, a main portion 34 that is connected to and supports the pair of pressing members 33, and a drive portion 35 for moving the main portion 34 in the inward-outward direction. The drive portion 35 is provided with a serration in the linear base portion of the pressing portions 33, a gear mechanism that meshes with this serration, and a motor for driving this gear mechanism. The linear base portions of the pressing members 33 extend at an angle, such as 45°, with respect to the transporting direction, and the pressing members 33 move in the direction in which their base members extend. Consequently, the direction in which the pressing members 33 are moved includes a component in the width direction.

With this configuration, the drive mechanism 35 moves the main portion 34 in the inward-outward direction so that the total of eight pressing members 33 abut against the glass substrate 2, sandwiching it therebetween from the side and thereby correcting the orientation of the glass substrate 2.

The main transport member 5a is described next, but structural components thereof that are identical to those of the transfer transport member 5b are assigned the same reference numerals as in the transfer transport member 5b and description thereof is omitted.

As shown in FIG. 8, the main transport member 5a is provided with a air-supplying-type support means 3, a drive force application means 4 for applying a drive force in the transporting direction to the glass substrate 2, and a casing member 7 that accommodates the air-supplying-type support means 3 and the drive force application means 4.

The main transport member 5a is not provided with the orientation correcting means 6 that is provided in the transfer transport member 5b, and the air-supplying-type support means 3 is fixedly supported by the support frame portion of the unit frame member 9. Also, only the through holes 15a are formed over the entire surface of the air rectifying plate 15 of the main transport member 5b, and no the recessed portions 15b are formed. Further, the accommodation casing 7 is provided with a transport cover 20 that spans the upper end of the pair of accommodation frames 8.

The manner in which the transfer transport member 5b is switched between a transport state and a transfer state is described below.

Figure 9A:
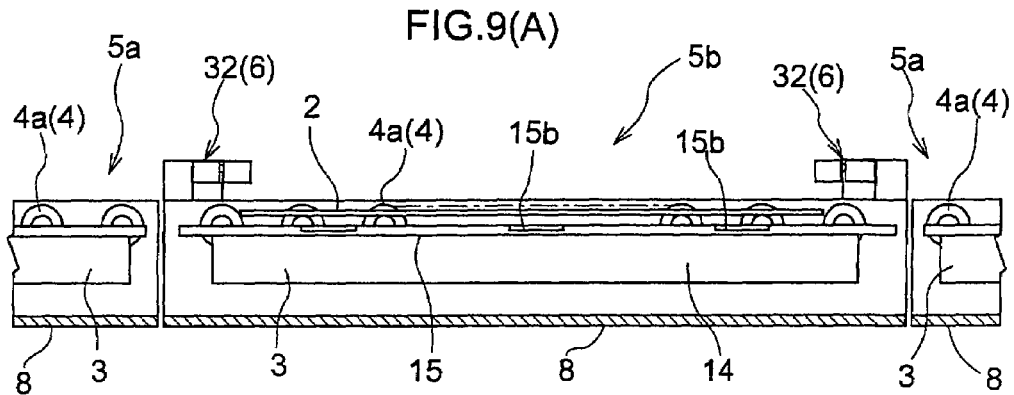
FIG. 9 is a lateral action view of the transfer transport member according to the first embodiment.
Figure 9B:
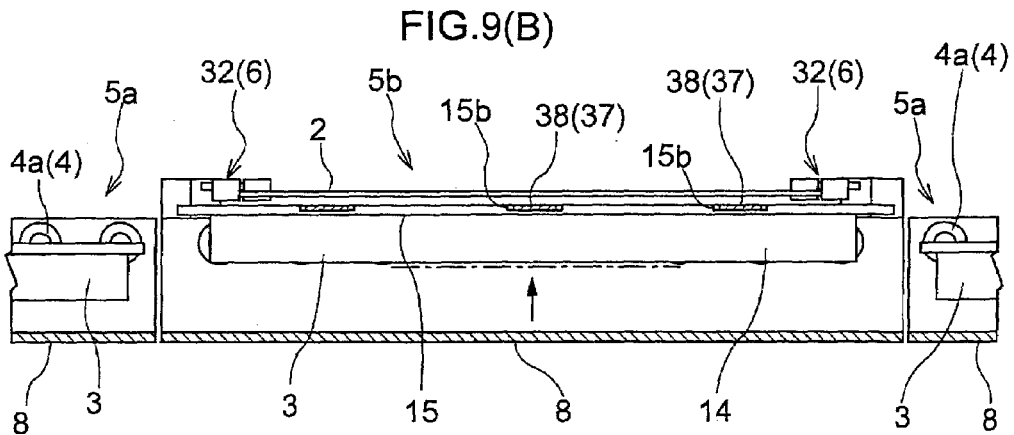

As shown in FIG. 9, the main transport member 5a and the transfer transport member 5b are provided at the same or substantially the same height. Also, as shown in FIG. 9A, the drive force application means 4 provided in the transfer transport member 5b is fixedly provided at the same or substantially the same height as the drive force application means 4 that is provided in the main transport member 5a, and the air-supplying-type support means 3 that is provided in the transfer transport member 5b can be raised and lowered between a lower position in which it supports the glass substrate 2 at the same or substantially the same height as the air-supplying-type support means 3 provided in the main transport members 5a, as shown in FIG. 9A, and an upper position in which it supports the glass substrate 2 at a height that is higher than the air-supplying-type support means 3 provided in the main transport members 5a, as shown in FIG. 9B.

That is, when the air-supplying-type support means 3 that is provided in the transfer transport member 5b is lowered to the lower position, then the transfer transport member 5b is switched to the transport state, in which the drive force application means 4 is brought into contact with the lower surface 2a of the glass substrate 2 that is supported by the air-supplying-type support means 3, and when the air-supplying-type support means 3 that is provided in the transfer transport member 5b is raised to the upper position, then the transfer transport member 5b is switched to the transfer state, in which the drive force application means 4 is shifted downward away from the glass substrate 2 that is supported by the air-supplying-type support means 3. In this manner, the transfer transport member 5b can be switched between a transport state and a transfer state by raising and lowering the air-supplying-type support means 3 provided therein.

As shown in FIG. 1, the transporting apparatus H is provided with transfer means 37 for performing a scooping task of scooping up the glass substrate 2 that is supported by the air-supplying-type support means 3 in the transfer transport member 5b and a lowering task of lowering the glass substrate 2 so that it is supported by the air-supplying-type support means 3 of the transfer transport member 5b. A loading portion 38 that is provided in the transfer means 37 can fit into the recessed portions 15b of the air rectifying plate 15.

The loading portion 38 that is provided in the transfer means 37 can receive and support the glass substrate 2 and is capable of moving in the vertical direction and in a horizontal direction that intersects the transporting direction. In addition to this, the loading portion 38 can rotate about a vertical axis and can suitably move in the transporting direction, for example. The loading portion 38 is formed in the shape of a fork having a plurality of fingers, and as shown in FIG. 1 and FIG. 10, in the transfer state of the transfer transport member 5b, the loading portion 38 can be inserted and removed in a horizontal direction, which intersects the transporting direction, to and from the space below the glass substrate 2 that is supported by the air-supplying-type support means 3, and moreover, is capable of supporting the air-supplying-type support means 3 when it has been inserted into the space below the glass substrate 2. The loading portion 38, which is formed in the shape of a fork, extends in a horizontal direction that intersects the transporting direction, when it is inserted and removed to and from the space below the glass substrate 2, and performs the scooping task and the lowering task from the side of the transfer transport member 5b. The transfer means 37 has a conventional structure, and for example it can be an industrial robot or the like, or can have a free moving- or fixed-type forklift structure in which it is driven by an electric motor or a combustion engine and moves the loading portion 38 via gears or a chain using an electric motor.

The scooping task, the lowering task, and main transporting, in which a glass substrate 2 is transported from a main transport member 5a on the transporting upstream side to a main transport member 5a on the transporting downstream side via the transfer transport member 5b, are described below.

Figure 10A:
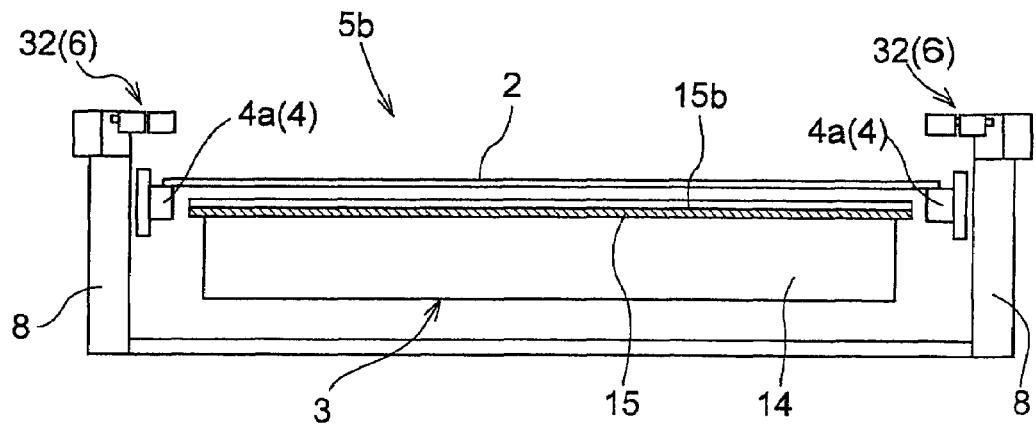
FIG. 10 is a front action view of the transfer transport member according to the first embodiment.

In main transporting, as shown in FIG. 9A and FIG. 10A, the air-supplying-type support means 3 that is provided in the transfer transport member 5b has been switched to the transport state and the drive force application means 4 that are provided in the main transport members 5a and the drive force application means 4 that is provided in the transfer transport member 5b are activated to apply a drive force in the main transporting direction to the glass substrate 2, consequently executing a main carry.

Figure 10B:
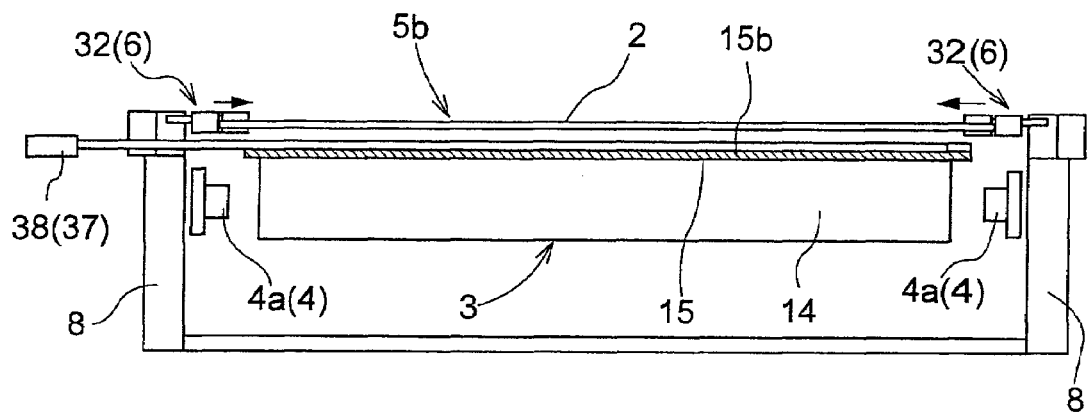

The scooping task is described next. First, when a scoop command is received from the command means X during main transporting, then the transported object sensor T1 detects that the glass substrate 2 has been transported up to a predetermined position of the transfer transport member 5b. Due to this, operation of the drive force application means 4 is halted. Then, with the glass substrate 2 supported by the air-supplying-type support means 3 that is provided in the transfer transport member 5b, that air-supplying-type support means 3 is raised up to the upper position, switching the transfer transport member 5b to the transfer state as shown in FIG. 9B and FIG. 10B.

The lower ends of the eight pressing members 33 in the orientation correcting means 6 are positioned lower than the lower surface of the glass substrate 2 due to the switch to the transfer state, and in this transfer state, the orientation correcting means 6 is activated to move the main portion 34 inward so as to abut the pressing members 33 against the glass substrate 2, which is supported by the air-supplying-type support means 3, from the side and thus correct the orientation of the glass substrate 2.

The loading portion 38 is then inserted into the space below the glass substrate 2 from the horizontal direction, which intersects the transporting direction, so that some or all of the loading portion 38 enters into the recessed portions 15b of the air rectifying plate 15. The loading portion sensor T2 detects that the loading portion 38 has been inserted, and based on the result of this detection, the orientation correcting means 6 is activated and moves the main portion 34 outward, releasing the pressing members 33 from abutting against the glass substrate 2.

Figure 9C:
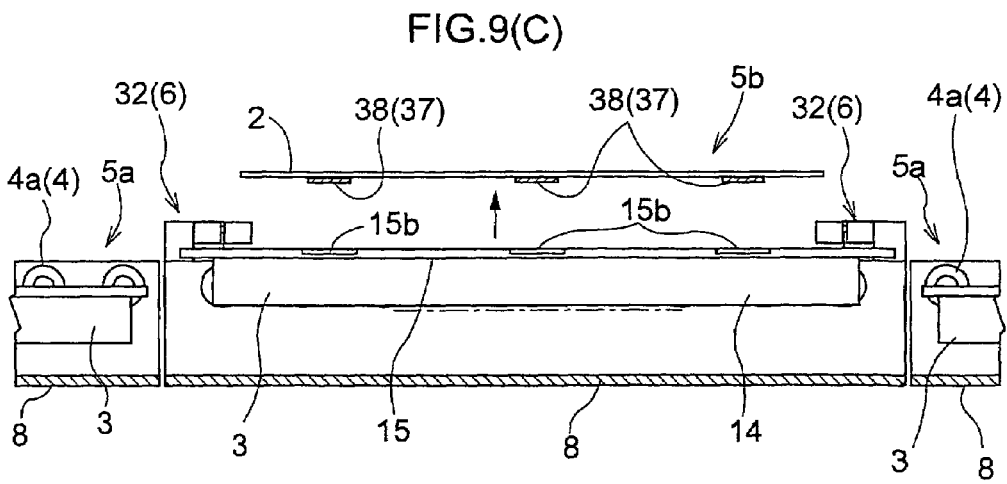
Figure 10C:
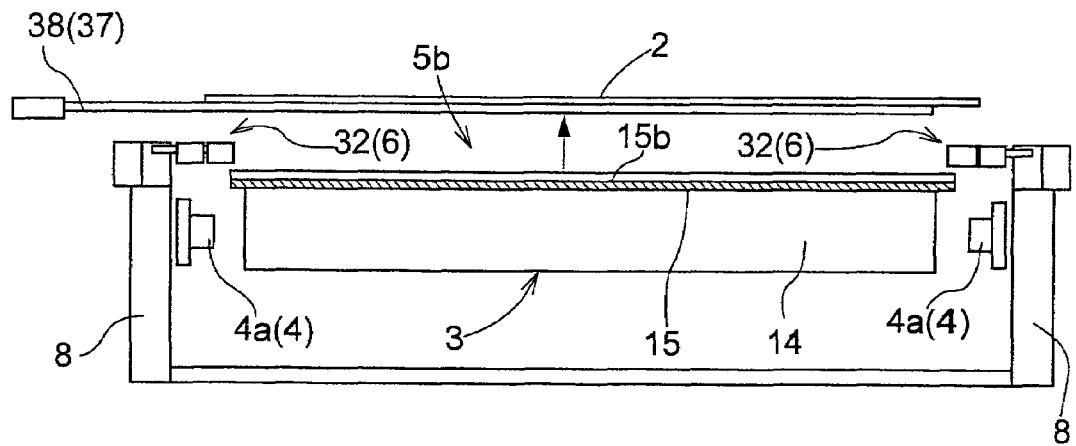

Then, by raising the loading portion 38, which has been inserted into the space below the glass substrate 2, as shown in FIG. 9C and FIG. 10C, the glass substrate 2 that has been supported by the air-supplying-type support means 3 rests on and is supported by the loading portion 38. The glass substrate 2 that has been scooped up by the loading portion 38 in this manner is transferred to a shelf for storing glass substrates, for example, by moving the loading portion 38.

Next, when the transported object sensor T1 returns to a non-detecting state due to the glass substrate 2 that is supported by the air-supplying-type support means 3 being scooped up by the loading portion 38, then, as shown in FIG. 9A and FIG. 10A, the air-supplying-type support means 3 that is provided in the transfer transport member 5b is lowered to the lower position to switch the transfer transport member 5b to the transfer state, after which the drive force application means 4 is activated to restart main transporting.

The lowering task is described next. First, when a lowering command is received from the command means X during main transporting, then, in the order of the drive force application means 4 provided in the main transport members 5a and the drive force application means 4 provided in the transfer transport member 5b, operation of the drive force application means 4 is halted in a state where the glass substrate 2 is not present on the transfer transport member 5b. Then, the air-supplying-type support means 3 provided in the transfer transport member 5b is raised to the upper position, switching the transfer transport member 5b to the transfer state.

In this state, when the loading portion 38 on which the glass substrate 2 is resting and supported as shown in FIG. 9C and FIG. 10C is lowered so that some or all of the loading portion 38 enters into the recessed portions 15b of the air rectifying plate 15 as shown in FIG. 9B and FIG. 10B, the glass substrate 2 that has been resting on and supported by the loading portion 38 comes to be supported by the air-supplying-type support means 3. When the loading portion sensor T2 detects that the loading portion 38 has entered into the recessed portions 15b, the orientation correcting means 6 is activated to move the main portion 34 inward so as to cause the pressing members 33 to abut against that glass substrate 2 that is supported by the air-supplying-type support means 3 from the side, correcting the orientation of the glass substrate 2.

The loading portion 38 is then withdrawn in the horizontal direction, which intersects the transporting direction, from the space below the glass substrate 2. When the loading portion sensor T2 comes to be in a non-detecting state, then, as shown in FIG. 9A and FIG. 10A, the orientation correcting means 6 is activated to move the main portion 34 outward, causing the pressing members 33 to stop abutting against the glass substrate 2, and the air-supplying-type support means 3 provided in the transfer transport member 5b is lowered to the lower position to switch the transfer transport member 5b to the transport state. The drive force application means 4. The drive force application means 4 is then activated, restarting the main transporting.

Second Embodiment

The second embodiment illustrates a separate implementation from that of the first embodiment of how the drive force application means 4 and the air-supplying-type support means 3 provided in the transfer transport member 5b are raised and lowered relative to one another, and the following description based on the drawings focuses on this aspect. It should be noted that structural elements that are the same as those of the first embodiment are assigned the same reference numerals as in the first embodiment, and description thereof is omitted.

Figure 12:
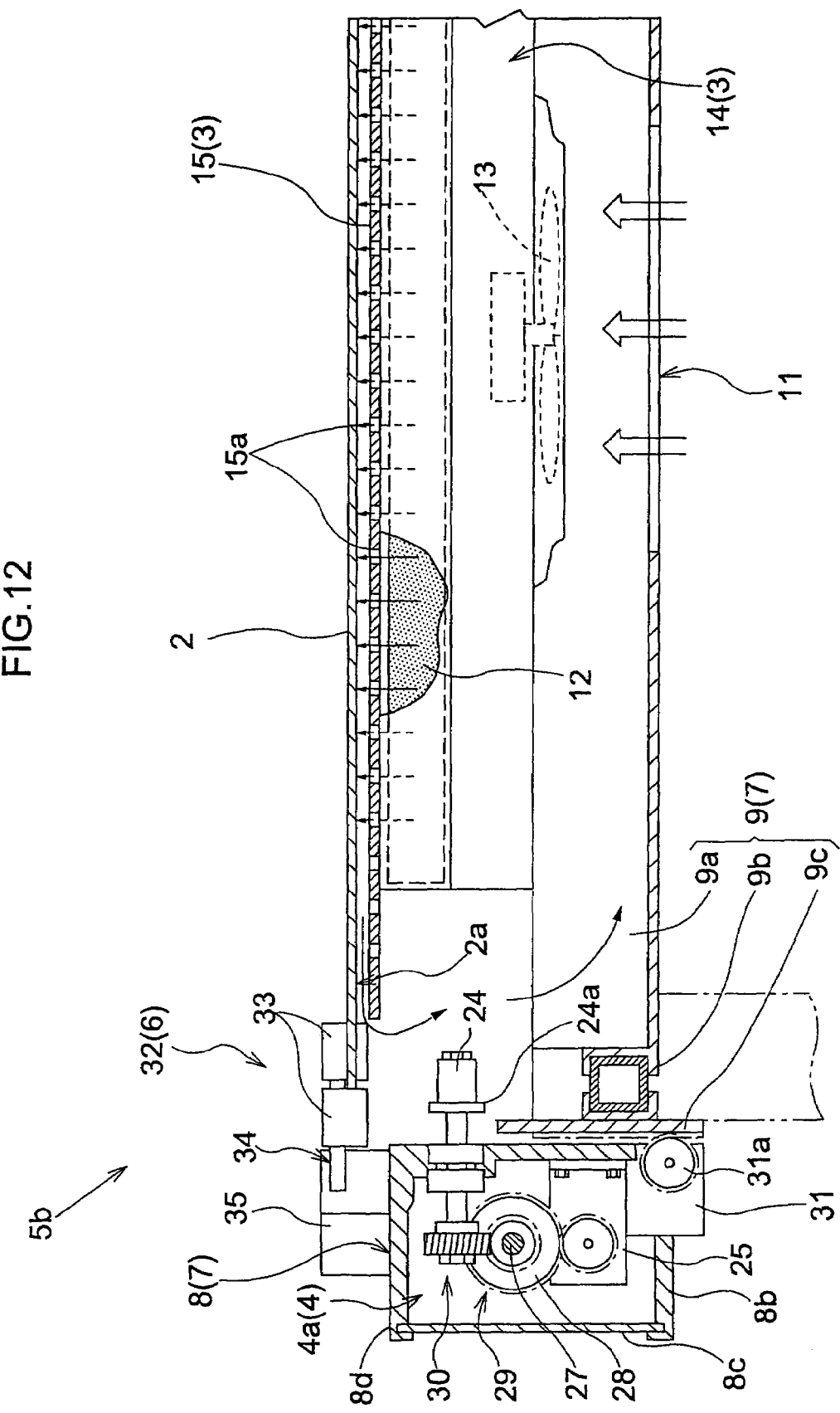
FIG. 12 is a partially magnified front view of the transfer transport member according to the second embodiment.

As shown in FIG. 12, one of the pair of accommodation frames 8 is supported by the unit frame member 9 in such a manner that it can move up and down freely. That is, an electric frame motor 31 for raising and lowering that accommodation frame 8 is provided in a lower portion of that accommodation frame 8, and an output gear 31a of the frame motor 31 meshes with a gear groove 9c formed in the lateral surface of a support frame portion 9a of the unit frame member 9. Consequently, the one accommodation frame 8 is raised and lowered by rotatively driving the frame motor 31 forward and in reverse, raising and lowering the drive force application portion 4a provided in that one accommodation frame 8.

Figure 14:
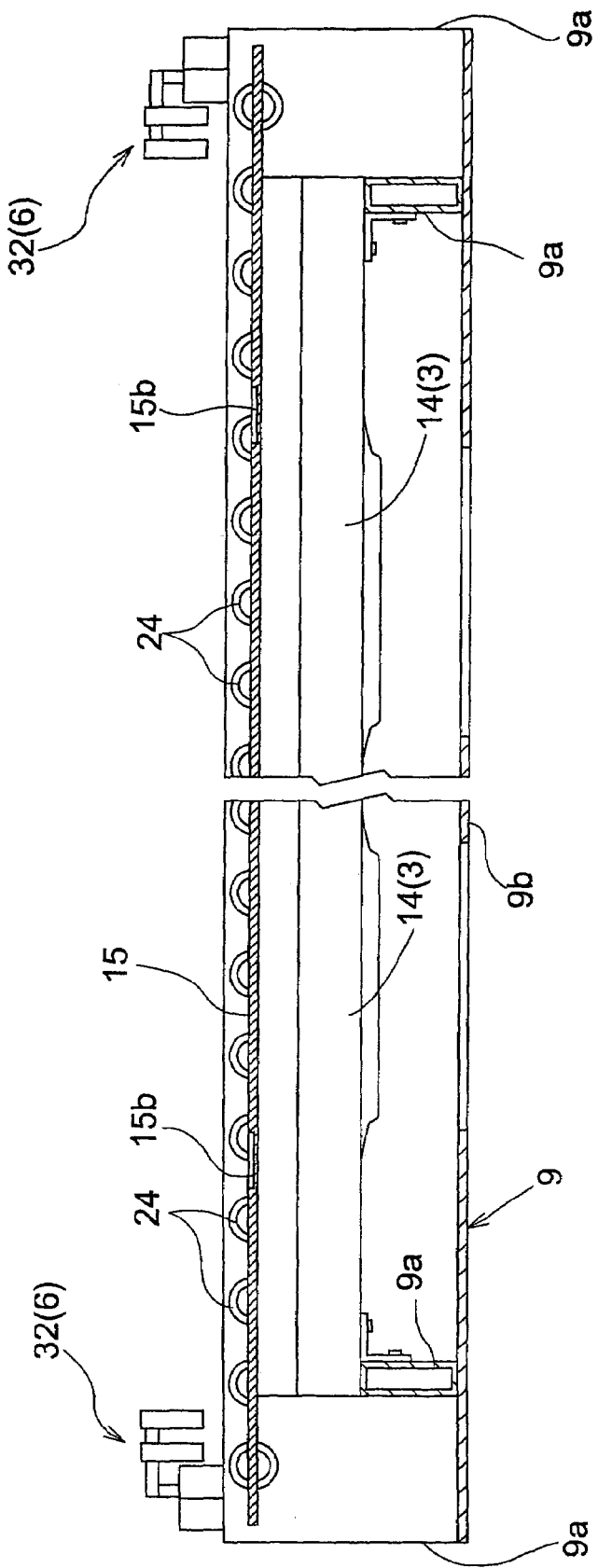
FIG. 14 is a lateral view of the transfer transport member according to the second embodiment.

Also, as shown in FIG. 14, the air-supplying-type support means 3 in the transfer transport member 5b is fixedly supported by the unit frame member 9.

Figure 13:
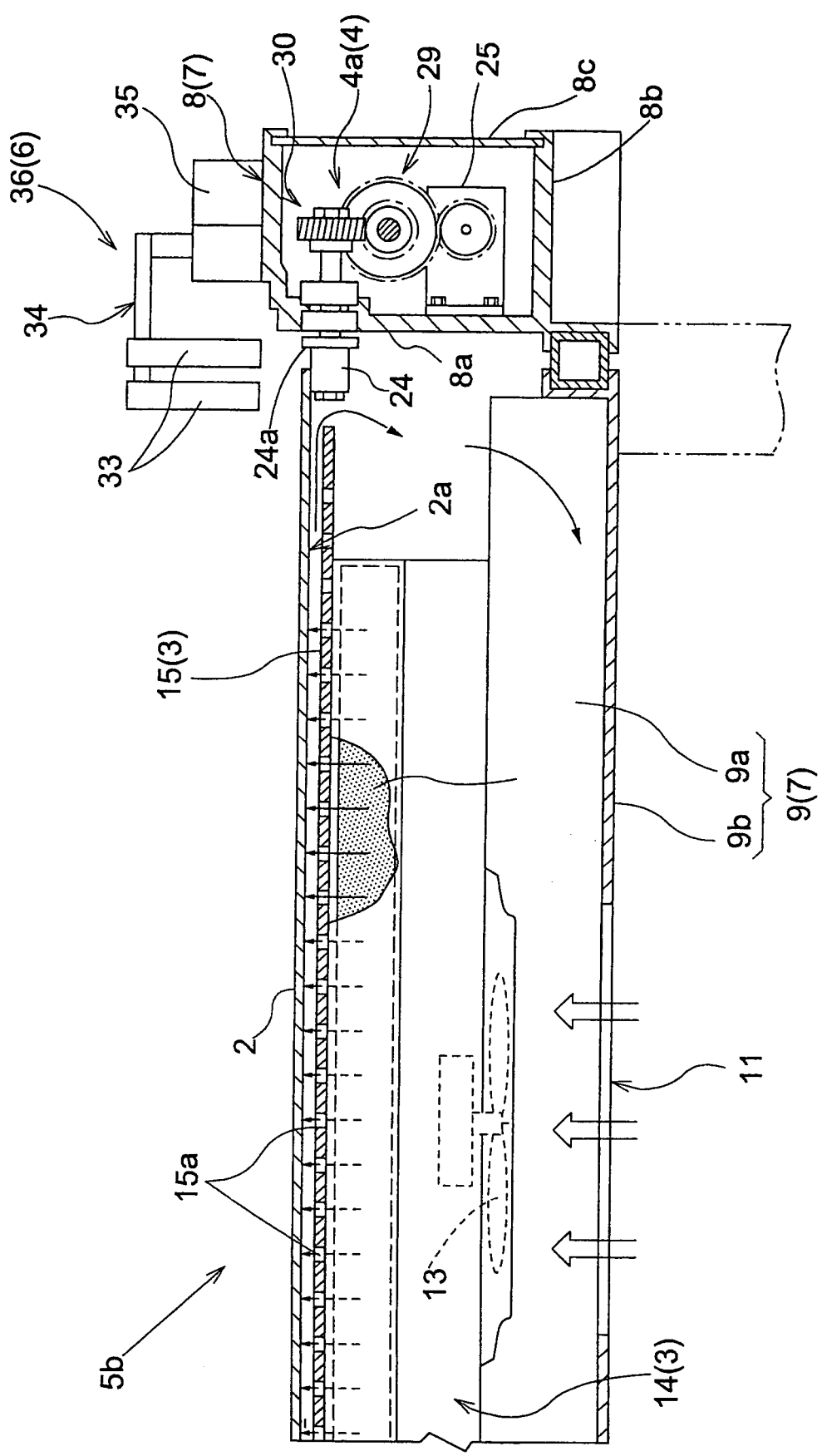
FIG. 13 is a partially magnified front view of the transfer transport member according to the second embodiment.

As for the orientation correcting means 6, as shown in FIG. 12, the abutting mechanisms 32 that rest on and are supported by the one accommodation frame 8 that is raised and lowered have the same structure as the abutting mechanisms 32 of the first embodiment, but as shown in FIG. 13, the abutting mechanisms 32 that rest on and are supported by the other accommodation frame 8, which is not raised and lowered, are configured so that their drive portion 35 moves the main portion 34 in the inward-outward direction as well as raising and lowering it.

The manner in which the transfer transport member 5b is switched between the transport state and the transfer state is described next.

Figure 15A:
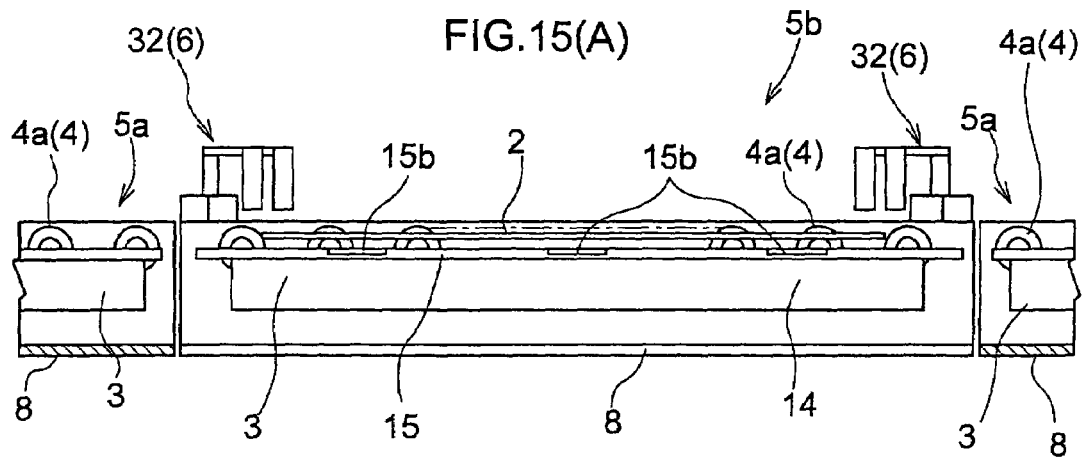
FIG. 15 is a lateral action view of the transfer transport member according to the second embodiment.
Figure 15B:
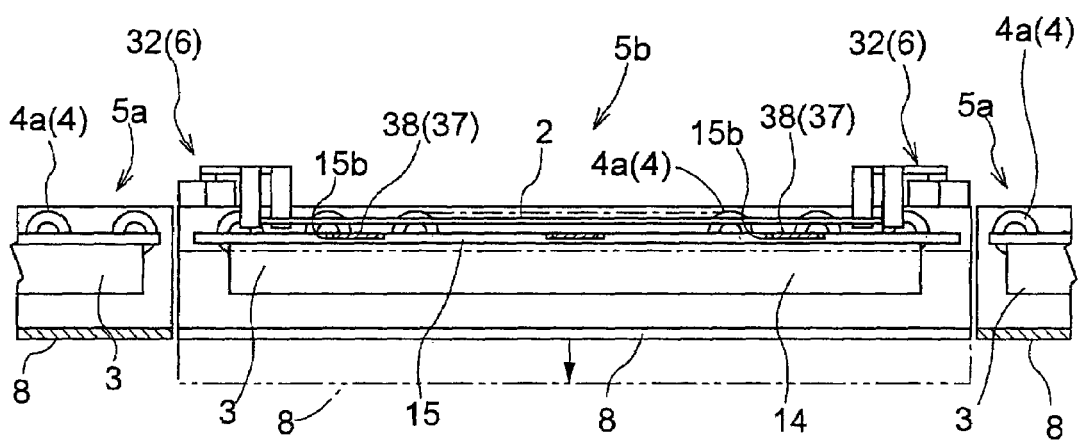

As shown in FIG. 15, the main transport member 5a and the transfer transport member 5b are provided at the same or substantially the same height. Also, as shown in FIG. 15A, the air-supplying-type support means 3 provided in the transfer transport member 5b is fixedly provided at the same or substantially the same height as the air-supplying-type support means 3 that is provided in the main transport member 5a, and the drive force application means 4 that is provided in the transfer transport member 5b is provided in such a manner that it can be raised and lowered between an upper position in which it is positioned at a height that is the same or substantially the same as that of the drive force application means 4 provided in the main transport members 5a, as shown in FIG. 16A, and a lower position in which it is positioned lower than the drive force application means 4 provided in the main transport members 5a, as shown in FIG. 16B.

That is, when the drive force application means 4 that is provided in the transfer transport member 5b is raised to the upper position, then the transfer transport member 5b is switched to the transport state, in which the drive force application means 4 is brought into contact with the lower surface 2a of the glass substrate 2 that is supported by the air-supplying-type support means 3, and when the drive force application means 4 that is provided in the transfer transport member 5b is lowered to the lower position, then the transfer transport member 5b is switched to the transfer state, in which the drive force application means 4 is shifted downward away from the glass substrate 2 that is supported by the air-supplying-type support means 3. In this manner the transfer transport member 5b can be switched between a transport state and a transfer state by raising and lowering the drive force application means 4 provided therein.

The scooping task and the lowering task are described below.

The scooping task is described next. First, when a scoop command is received from the command means X during main transporting, such as that shown in FIG. 15A and FIG. 16A, then the transported object sensor T1 detects that the glass substrate 2 has been transported to a predetermined position of the transfer transport member 5b, and as a result, operation of the drive force application means 4 is halted. Then, with the glass substrate 2 supported by the air-supplying-type support means 3 that is provided in the transfer transport member 5b, the one drive force application portion 4a that is provided in the transfer transport member 5b is lowered to the lower position, switching the transfer transport member 5b to the transfer state as shown in FIG. 15B and FIG. 16B.

The lower ends of the four pressing members 33 on the transfer means 37 side, of the eight pressing members 33 in the orientation correcting means 6, are positioned lower than the lower surface of the glass substrate 2 due to switching to the transfer state, and the lower ends of the remaining four pressing members 33 on the side opposite the transfer means 37 are lowered by the drive portion 35 and positioned lower than the lower surface of the glass substrate 2, and in this transfer state, the orientation correcting means 6 is activated to move the main portion 34 inward so as to cause the pressing members 33 to abut against the glass substrate 2, which is supported by the air-supplying-type support means 3, from the side and thus correct the orientation of the glass substrate 2.

The loading portion 38 is then inserted into the space below the glass substrate 2 from the horizontal direction, which intersects the transporting direction, so that some or all of the loading portion 38 enters into the recessed portions 15b of the air rectifying plate 15. The loading portion sensor T2 detects that the loading portion 38 has been inserted. Based on the result of this detection, the orientation correcting means 6 is activated and moves the main portion 34 outward, releasing the pressing members 33 from abutting against the glass substrate 2.

Figure 15C:
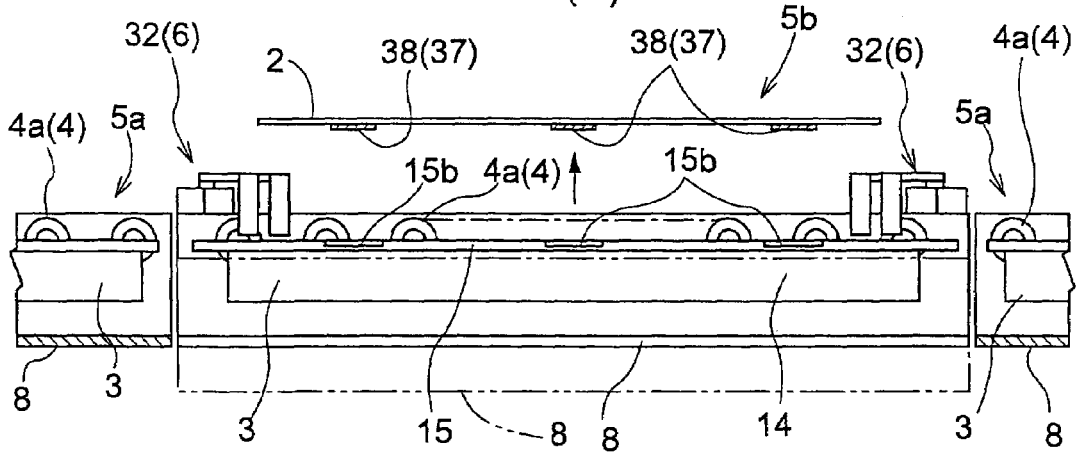
Figure 16A:
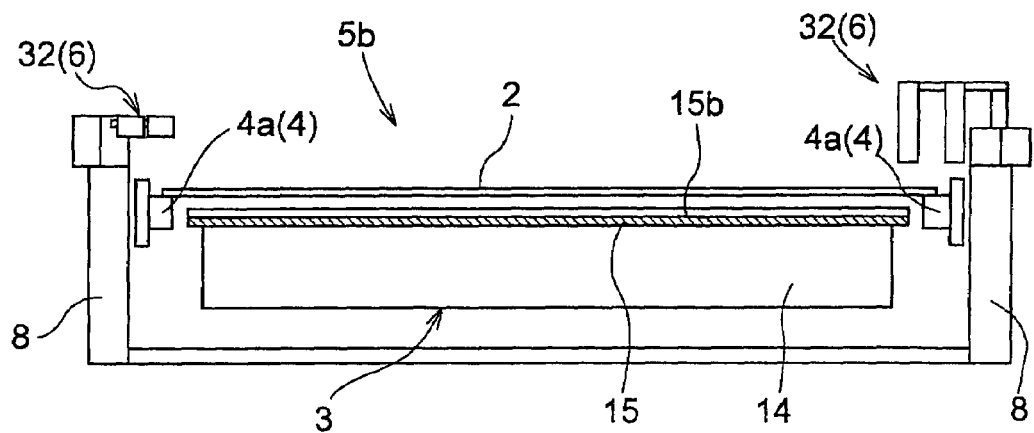
FIG. 16 is a front action view of the transfer transport member according to the second embodiment.
Figure 16B:
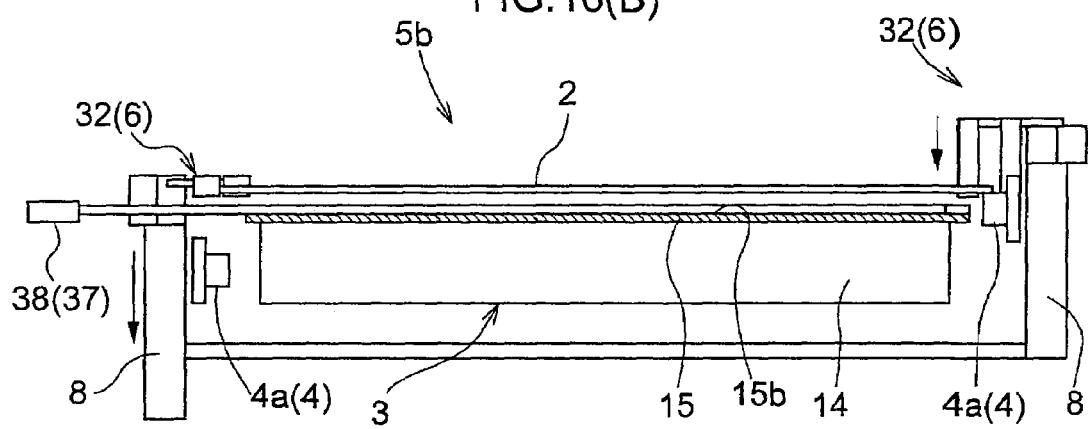
Figure 16C:
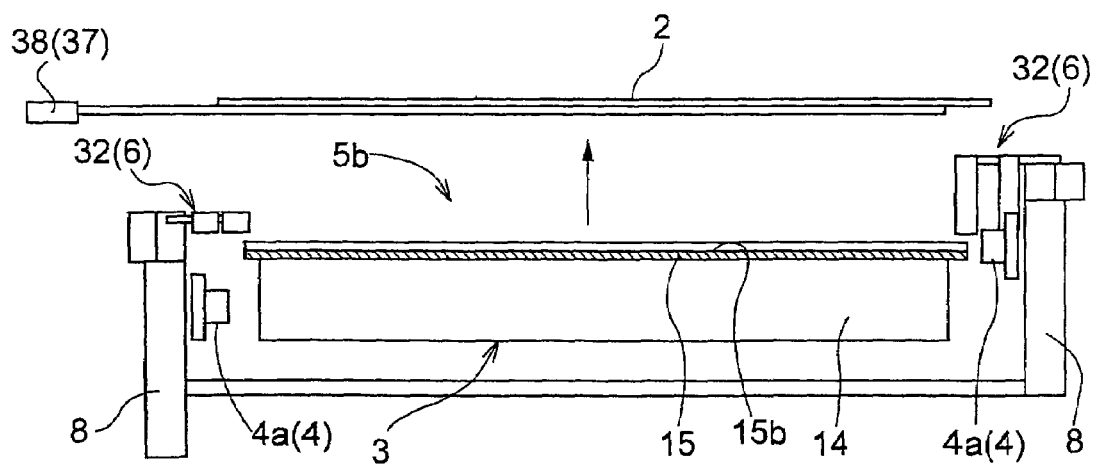

Then, by raising the loading portion 38, which has been inserted into the space below the glass substrate 2, as shown in FIG. 15C and FIG. 16C, the glass substrate 2 that has been supported by the air-supplying-type support means 3 is put into a state where it rests on and is supported by the loading portion 38. The glass substrate 2 that has been scooped up by the loading portion 38 in this manner is transferred to a shelf for storing glass substrates, for example, by moving the loading portion 38.

Next, when the transported object sensor T1 returns to a non-detecting state due to the glass substrate 2 that is supported by the air-supplying-type support means 3 being scooped up by the loading portion 38, then, as shown in FIG. 15A and FIG. 16A, the one drive force application portion 4a that is provided in the transfer transport member 5b is raised to the upper position to switch the transfer transport member 5b to the transfer state, after which the drive force application mean 4 is activated to restart main transporting.

The lowering task is described next. First, when a lowering command is received from the command means X during main transporting, then, in the order of the drive force application means 4 provided in the main transport members 5a and the drive force application means 4 provided in the transfer transport member 5b, operation of the drive force application means 4 is halted, stopping operation of the drive force application means 4 with the glass substrate 2 not present on the transfer transport member 5b, after which the one drive force application portion 4a provided in the transfer transport member 5b is lowered to the lower position, switching the transfer transport member 5b to the transfer state.

In this state, when the loading portion 38 on which the glass substrate 2 is resting and supported as shown in FIG. 15C and FIG. 16C is lowered so that some or all of the loading portion 38 enters into the recessed portions 15b of the air rectifying plate 15 as shown in FIG. 15B and FIG. 16B, the glass substrate 2 that has been resting on and supported by the loading portion 38 comes to be supported by the air-supplying-type support means 3. When the loading portion sensor T2 detects that the loading portion 38 has entered into the recessed portions 15b, the orientation correcting means 6 is activated to move the main portion 34 inward so as to cause the pressing members 33 to abut against the glass substrate 2 that is supported by the air-supplying-type support means 3 from the side, thereby correcting the orientation of the glass substrate 2.

The loading portion 38 is then withdrawn in the horizontal direction, which intersects the transporting direction, from the space below the glass substrate 2, causing the loading portion sensor T2 to enter a non-detecting state, and then, as shown in FIG. 15A and FIG. 16A, the orientation correcting means 6 is activated to move the main portion 34 outward and cause the pressing members 33 to stop abutting against the glass substrate 2. The one drive force application portion 4a provided in the transfer transport member 5b is raised up to the upper position to switch the transfer transport member 5b to the transport state, after which the drive force application means 4 are activated to restart main transporting.

Other Embodiments (1) In the foregoing embodiments, recessed portions are formed in the air rectifying plate 15 in the air-supplying-type support means 3 in order to provide recessed portions that the loading portion 38 can enter into in the air-supplying-type support means 3, but it is also possible to form vertical through holes in a horizontal direction that intersects the transporting direction in the air rectifying plate 15, or to provide a plurality of separate air rectifying plates 15 that are arranged resting on and supported by the air-supplying-type support means 3 with a spacing between them in the transporting direction and to form recessed portions 15b between the air rectifying plates 15.

It is also possible to form or not to form through holes 15a in the recessed portions 15b of the air rectifying plate 15.

(2) In the foregoing embodiments, both the scooping task and the lowering task were performed, but it is also possible to adopt a configuration in which only one of the scooping task and the lowering task is performed. That is, for example, it is possible to adopt a configuration in which a main transporting portion 5a is not provided on the transporting downstream side of the transfer transporting portion 5b and only the lowering task is performed, or a configuration in which a main transport member 5a is not provided on the transporting upstream side of the transfer transport member 5b and only the scooping task is performed.

(3) In the second embodiment, one of the two accommodation frames 8 of the pair of accommodation frames 8 is structured so that it can be raised and lowered freely, but it is also possible to adopt a configuration in which both can be raised and lowered freely and the scooping task and the lowering task are performed from both sides in a horizontal direction that intersects the transporting direction of the transfer transport member.

(4) In the foregoing embodiments, the command means is operated manually, but it is also possible to adopt a configuration in which is it operated automatically, such as automatically executing a lowering command based on distinguishing information on whether or not the lowering task is to be performed with respect to the glass substrate 2 that is being transported.

(5) In the foregoing embodiments, the drive force application portions 4a are provided with a plurality of drive rollers 24, but it is also possible to provide an endless belt-shaped member such as a timing belt in place of the plurality of drive rollers 24.

(6) In the foregoing embodiments, fan filter units 14 integrally incorporating a dust-removal filter 12 and a blowing fan 13 as a single unit served as examples, but it is not absolutely necessary that the dust-removal filters 12 and the blowing fans 13 are attached as a single unit, and an implementation in which the dust-removal filters 12 and the blowing fans 13 are provided separately by supplying a guide route or the like for guiding the air that is blown by the blowing fans 13 to the dust-removal filters 12 is also possible.

(7) In the foregoing embodiments, glass substrates 2 for a liquid crystal served as examples of the transported object, but the transported object may also be semiconductor wafers, for example, and the shape or size of the transported object is not limited by the embodiments.

What is claimed is:

1. A transporting apparatus, comprising:
a transport member comprising:
air-supplying-type support means for supplying purified air toward a lower surface of a transported object to contactlessly support the transported object, and
drive force application means for contacting a lower surface of the transported object that is supported by the air-supplying-type support means and for applying a drive force in the transporting direction to the transported object;
wherein the transport member is provided with a main transport member that is capable of transporting the transported object in the transporting direction, and a transfer transport member that is positioned next to the main transport member in the transporting direction and that is capable of transporting the transported object between itself and the main transport member;
wherein the transfer transport member can be switched, by relative vertical movement between the drive force application means and the air-supplying-type support means provided in the transfer transport member, between a transport state, in which the drive force application means is brought into contact with the lower surface of the transported object that is supported by the air-supplying-type support means, and a transfer state, in which the drive force application means is moved downwardly away from the transported object that is supported by the air-supplying-type support means; and
wherein a transfer means furnished with a loading portion that can receive and support the transported object and that can be moved in a horizontal direction that intersects the transporting direction and in the vertical direction is provided, wherein the loading portion, when the transfer transport member is in the transfer state, can be inserted and withdrawn in a horizontal direction, which intersects the transporting direction, into and from a space below the transported object that is supported by the air-supplying-type support means, and wherein the loading portion is formed such that, when the loading portion has been inserted into the space below the transported object, the loading portion permits support of the transported object by the air-supplying-type support means.

2. The transporting apparatus according to claim 1, wherein in the transfer transport member, the drive force application means is provided at substantially the same height as the drive force application means that is provided in the main transport member; and the air-supplying-type support means is provided in such a manner that it can be raised and lowered, such that in the transport state it is in a lower position where it supports the transported object at substantially the same height as the air-supplying-type support means that is provided in the main transport member, and in the transfer state it is in an upper position where it supports the transported object at a height that is higher than the air-supplying-type support means that is provided in the main transport member.

3. The transporting apparatus according to claim 1, wherein in the transfer transport member, the air-supplying-type support means is fixedly provided at a height where it supports the transported object at substantially the same height as the air-supplying-type support means that is provided in the main transport member; and the drive force application means is provided in such a manner that it can be raised and lowered, such that in the transport state it is in an upper position in which it is positioned at substantially the same height as the drive force application means that is provided in the main transport member, and in the transfer state it is in a lower position in which it is positioned lower than the drive force application means that is provided in the main transport member.

4. The transporting apparatus according to claim 1, wherein the transfer transport member is provided with orientation correcting means for correcting the orientation of the transported object by abutting against the transported object that is supported by the air-supplying-type support means in the transfer state.

5. The transporting apparatus according to claim 1, wherein the loading portion is formed in a fork-shape that extends in a horizontal direction that intersects the transporting direction; and wherein the air-supplying-type support means is provided with a recessed portion formed in a horizontal direction that intersects the transporting direction, into which the loading portion can enter.

6. The transporting apparatus according to claim 1, wherein the air-supplying-type support means has blowing units arranged side by side in the transporting direction, each blowing unit having a dust-removal filter for removing dust and blowing means for supplying purified air through that dust-removal filter toward the lower surface of the transported object, wherein the dust-removal filter and the blowing means are incorporated into a single unit to form each blowing unit.

7. A transporting apparatus comprising:
a transfer transport member comprising the following:
  a housing;
  a fan supported by the housing;
  a porous member provided above the fan and supported by the housing;
  a filter disposed between the fan and the porous member and supported by the housing;
  a casing accommodating the housing;
  an actuator that is disposed between the housing and the casing and that moves the housing with respect to the casing, wherein the actuator moves the housing between a first position and a second position;
  a plurality of drive rollers that are supported by the casing at a position above the porous member and that drive the transported object in the transporting direction; and
  a loading portion that, when the housing is in the first position, is inserted between the transported object and the porous member and supports the transported object.

8. The transporting apparatus according to claim 7, wherein the loading portion has a plurality of long finger portions.

9. The transporting apparatus according to claim 8, wherein grooves are formed in the porous member along the path in which the finger portions are moved.

10. The transporting apparatus according to claim 8, further comprising:
at least one main transport member provided on at least one of the upstream side and the downstream side of the transfer transport member, wherein the main transport member comprises:
  a casing;
  a fan supported by the casing;
  a porous member provided above the fan and supported by the casing;
  a filter disposed between the fan and the porous member and supported by the casing; and
  a plurality of drive rollers that are supported by the casing at a position above the porous member and that drive the transported object in the transporting direction.

11. A transporting apparatus comprising:
a transfer transport member comprising:
  a casing;
  a fan supported by the casing;
  a porous member provided above the fan and supported by the casing;
  a filter disposed between the fan and the porous member and supported by the casing;
  a moveable frame that can move with respect to the casing;
  drive rollers that are supported by the moveable frame at a position above the porous member and that drive the transported object in the transporting direction;
  an actuator that is disposed between the moveable frame and the casing and that moves the moveable frame with respect to the casing, wherein the actuator moves the moveable frame between an upper position and a lower position; and
  a loading portion that, when the moveable frame is in the lower position, can be inserted between the transported object and the porous member and that is adapted to support the transported object.

12. The transporting apparatus according to claim 11, wherein the loading portion has a plurality of long finger portions.

13. The transporting apparatus according to claim 11, further comprising:
a fixed frame; and
drive rollers for driving the transported object that is supported by the fixed frame in the transporting direction.

14. The transporting apparatus according to claim 12, wherein grooves are formed in the porous member along the path in which the finger portions are moved.

15. The transporting apparatus according to claim 11, further comprising:

at least one main transport member provided on at least one of the upstream side and the downstream side of the transfer transport member, wherein the main transport member comprises:

a casing;

a fan supported by the casing;

a porous member provided above the fan and supported by the casing;

a filter disposed between the fan and the porous member and supported by the casing; and a plurality of drive rollers that are supported by the casing at a position above the porous member and that drive the transported object in the transporting direction.

* * * * *